United States Patent [19]
Yamada et al.

[11] 3,970,291
[45] July 20, 1976

[54] METHOD OF PREVENTING OCCURRENCE OF PULSATION IN A CIRCULATING LIQUID FOR EVAPORATIVE COOLING

[75] Inventors: Takeo Yamada; Kazuo Kunioka; Toyokazu Teramoto, all of Yokohama, Japan

[73] Assignee: Nippon Kokan Kabushiki Kaisha, Tokyo, Japan

[22] Filed: Dec. 26, 1974

[21] Appl. No.: 536,481

[30] Foreign Application Priority Data
Dec. 28, 1973 Japan.................................. 49-956

[52] U.S. Cl. ............................... 266/193; 122/6 R
[51] Int. Cl.² ......................................... C21B 7/10
[58] Field of Search ....................... 266/32; 122/6 R

[56] References Cited
UNITED STATES PATENTS

| | | | |
|---|---|---|---|
| 3,245,401 | 4/1966 | Kast ................................. | 122/6 R X |
| 3,692,103 | 9/1972 | Andoniev et al. ................ | 266/32 X |
| 3,693,708 | 9/1972 | Andoniev et al. ................ | 266/32 X |
| 3,723,632 | 3/1973 | Beizerov ........................... | 266/32 X |
| 3,750,629 | 8/1973 | Cramer et al. ................... | 266/32 X |
| 3,818,870 | 6/1974 | Andoniev et al. ................ | 266/32 X |

FOREIGN PATENTS OR APPLICATIONS

| | | | |
|---|---|---|---|
| 7,204,763 | 6/1967 | Japan.................................... | 266/32 |

*Primary Examiner*—Gerald A. Dost
*Assistant Examiner*—Howard N. Goldberg
*Attorney, Agent, or Firm*—Cushman, Darby & Cushman

[57] ABSTRACT

A method of preventing occurrence of pulsation in a circulating liquid for evaporative cooling which, in the case of passing the circulating liquid received within a steam separator through a cooling stave of a blast furnace and feeding said circulating liquid back into the separator through an inlet thereof thereby to perform the evaporative cooling operation for said blast furnace, comprises the step of raising, where the fraction dryness of the circulating liquid fed back into the separator is not greater than a prescribed value, the surface level of the circulating liquid within the separator up to a position higher than said inlet, and the step of lowering, where said fraction dryness of said circulating liquid exceeds said prescribed value, said surface level up to a position lower than said inlet.

6 Claims, 3 Drawing Figures

METHOD OF PREVENTING OCCURRENCE OF PULSATION IN A CIRCULATING LIQUID FOR EVAPORATIVE COOLING

This invention relates to a method of preventing occurrence of pulsation in a circulating liquid for evaporative cooling flowing through a cooling stave of a blast furnace.

In the prior art method of cooling the blast furnace using the cooling stave based on the utilization of an evaporative cooling system there are provided a large number of cooling pipes which vertically extend through the cooling stave and are arranged at horizontally proper positions; and the lower ends of said cooling pipes are connected through a delivery pipe to the bottom section of a steam separator and simultaneously the upper ends of said cooling pipes are connected to the separator through a discharge pipe associated with an inlet of the separator, whereby, while the surface level of the circulating liquid received within the separator is being maintained at a position lower than the inlet of the separator, said circulating liquid is circulated from the separator to the separator through the cooling pipes.

In the above prior art case, the circulating flow of the circulating liquid takes place due to the liquid density difference resulting from the liquid temperature difference between the circulating liquid within the delivery pipe and the circulating liquid of an upstream or discharging side including the cooling pipes and discharge pipe. Further, in this case, while said flow of the circulating liquid is caused to occur, the surface level of the circulating liquid within the separator is always maintained at a position lower than the position of that inlet of the separator connecting to the delivery pipe, for the purpose of principally elevating the steam separation efficiency. The reason is that if the surface level of the circulating liquid within the separator is located at a position higher than said inlet, the amount of circulating liquid stored in the separator will be increased with the result that a separator capacity for vapor reception is decreased by that extent to deteriorate the steam separating ability of the separator; and where the steam separation is thus performed with no high efficiency, extreme difficulties are presented in gauging and controlling said surface level of the circulating liquid, failing to achieve a stable liquid circulation.

However, the foregoing prior art liquid circulation method raises unpreferable problems, of which explanation is made as follows. Generally, during some length of time after the blast furnace ignition, the fire bricks provided within the blast furnace remains whole and therefore the thermal load applied to the cooling stave is extremely low. But as the blast furnace operation goes on, the fire bricks are worn by degrees, and entirely lost after lapse of about six months. As a result, the cooling stave is thereafter applied with a high thermal load and brought to a thermally stabilized condition. However, there is required a considerable length of period by the time when the cooling stave is brought to such stable condition. On the other hand, it is unusual that wear of the fire bricks is uniformly caused for a short time and it is usual that such fire bricks wear continues to be locally caused over a large length of time, from which there results that the cooling stave, accordingly, cooling pipes are locally applied with a high thermal load during such large length of period. If, at this time, the circulating liquid within the cooling pipes already commences to be circulated thereby permitting a cooled liquid to be always passed through said local portions of the cooling pipes, no problems will arise. In the prior art case, however, unless the circulating liquid within the cooling pipes is heated up to a temperature sufficient to cause a liquid expansion thereby permitting the surface level of the circulating liquid within the separator to exceed the position of the inlet below which said surface level has heretofore been located, no liquid circulation will occur. Accordingly, when thermal load is locally applied to the cooling pipes during no liquid circulation, a vapor generation is rapidly caused at those local portions, and this vapor, in some cases, is entered into the separator without being extinguished in the course of upstream movement and, in other cases, is condensed and extinguished in the course of upstream movement. In any case, however, considerably strong pulsation occurs in the circulating liquid, resulting in the apparatus being damaged due to a water hammer phenomenon originating in said pulsation.

The object of the invention is to provide a method of preventing occurrence of pulsation in a circulating liquid, for use in the case where blast furnace cooling is performed by a cooling stave utilizing an evaporative cooling system.

For attaining the above object, the method of the invention comprises the first step of maintaining, where the circulating liquid within a discharge pipe is in a first condition in which the fraction dryness thereof is not greater than a prescribed value, the surface level of the circulating liquid within a steam separator to be at a position higher than an inlet of the separator connecting to the discharge pipe, and the second step of maintaining, where the circulating liquid within the discharge pipe is in a second condition in which the fraction dryness thereof exceeds said prescribed value, said surface level of the circulating liquid within the steam separator to be at a position lower than said inlet.

Since, in said first step, said inlet is situated below the surface level of the circulating liquid within the separator, circulation of the circulating liquid starts to be effected simultaneously with the heating of cooling pipes after ignition of the blast furnace, so that even where the cooling pipes are locally heated due to the local damages of fire bricks within the blast furnace, no strong pulsation occurs in the circulating liquid. As a result, cooling of the blast furnace is smoothly carried out to cause no occurrence of such apparatus damages as explained in the prior art case.

When the blast furnace operation goes on to cause high thermal load to be applied to the cooling stave thereby rendering the circulating liquid rich in vapor, the circulating flow force becomes great. Where, at this time, the apparatus remains set at said first step, the surface level of the circulating liquid within the separator is maintained to be relatively high, and a separator capacity for vapor reception is maintained to be relatively small, and further the circulating liquid fed back into the separator through the discharge pipe flows into the circulating liquid body below said surface level in a state containing vapor therein. As a result, the steam separation within the separator is not carried out with high efficiency, and a stable liquid circulation is not achieved, and further difficulties are presented in gauging and controlling the surface level of the circulating liquid within the separator.

For avoiding the foregoing inconveniences, the fraction dryness of the circulating liquid upwardly flowing through the discharge pipe beforehand set to a proper value, and when said fraction dryness has reached this predetermined or prescribed value, the first step is changed-over to the second step. In said second step, since the surface level of the circulating liquid within the separator is lowered up to a position lower than said inlet of the separator, the steam separating ability of the separator is improved to enable a stable evaporative cooling function to be performed.

For the purpose of obtaining a good circulating flow through both the first and second steps, it is preferred in the first step that the surface level of the circulating liquid within the separator is maintained to be at a position raised from the lower end of said inlet by an extent equal to a value one to two times the diameter of said inlet, while it is preferred in the second step that said surface level is maintained at a position lowered from the lower end of said inlet by an extent equal to a value one to two times the diameter of said inlet. Further it is preferred that the place where the fraction dryness of the circulating liquid is measured is that portion of the discharge pipe interior which is located at a position lowered from the lower end of said inlet by an extent equal to a value five to six times the diameter of said inlet of the separator.

Further, it is preferred that the fraction dryness of the circulating liquid, i.e., said prescribed value when the first step is changed-over to the second step is chosen to be 5 to 20% or preferably about 10%. If said prescribed value is determined within this range of percentage, the change-over of said surface level from the first step to the second step will be able to be smoothly and stably carried out.

An apparatus for preventing occurrence of pulsation in a circulating liquid for evaporative cooling flowing through a cooling stave of a blast furnace comprises a steam separator having an outlet for permitting said circulating liquid to be delivered therethrough to the cooling stave and an inlet for permitting said circulating liquid fed back from the cooling stave to be supplied therethrough into said separator, a discharge pipe connecting the cooling stave to said inlet, a supplementary feed pipe for supplementarily supplying said circulating liquid to said separator, first means provided for said discharge pipe, for detecting a first condition in which the fraction dryness of the circulating liquid within said discharge pipe is not greater than a prescribed value and a second condition in which said fraction dryness exceeds said prescribed value, and second means for, when said first means has detected said first condition, raising the surface level of said circulating liquid within said separator up to a position higher than the upper end of said inlet and simultaneously maintaining said surface level at the raised position, and when said first means has detected said second condition, lowering said surface level up to a position lower than the lower end of said inlet and simultaneously maintaining said surface level at the lowered position.

As said first means there can be employed a fraction dryness measuring device, i.e., a void meter. As said second means there can be employed an automatic control device which comprises a level meter for gauging the surface level of the circulating liquid within the separator, level setting apparatus for permitting said surface level to be moved up to a prescribed position, a controller for sending output signals upon receipt of signals sent from said level meter and level setting apparatus, a valve positioner operative upon receipt of said output signals, and a valve driven by said valve positioner to control the flow of the circulating liquid passing through said supplementary feed pipe.

This invention can be more fully understood from the following detailed description when taken in conjunction with the accompanying drawings, in which.

Figure 1:
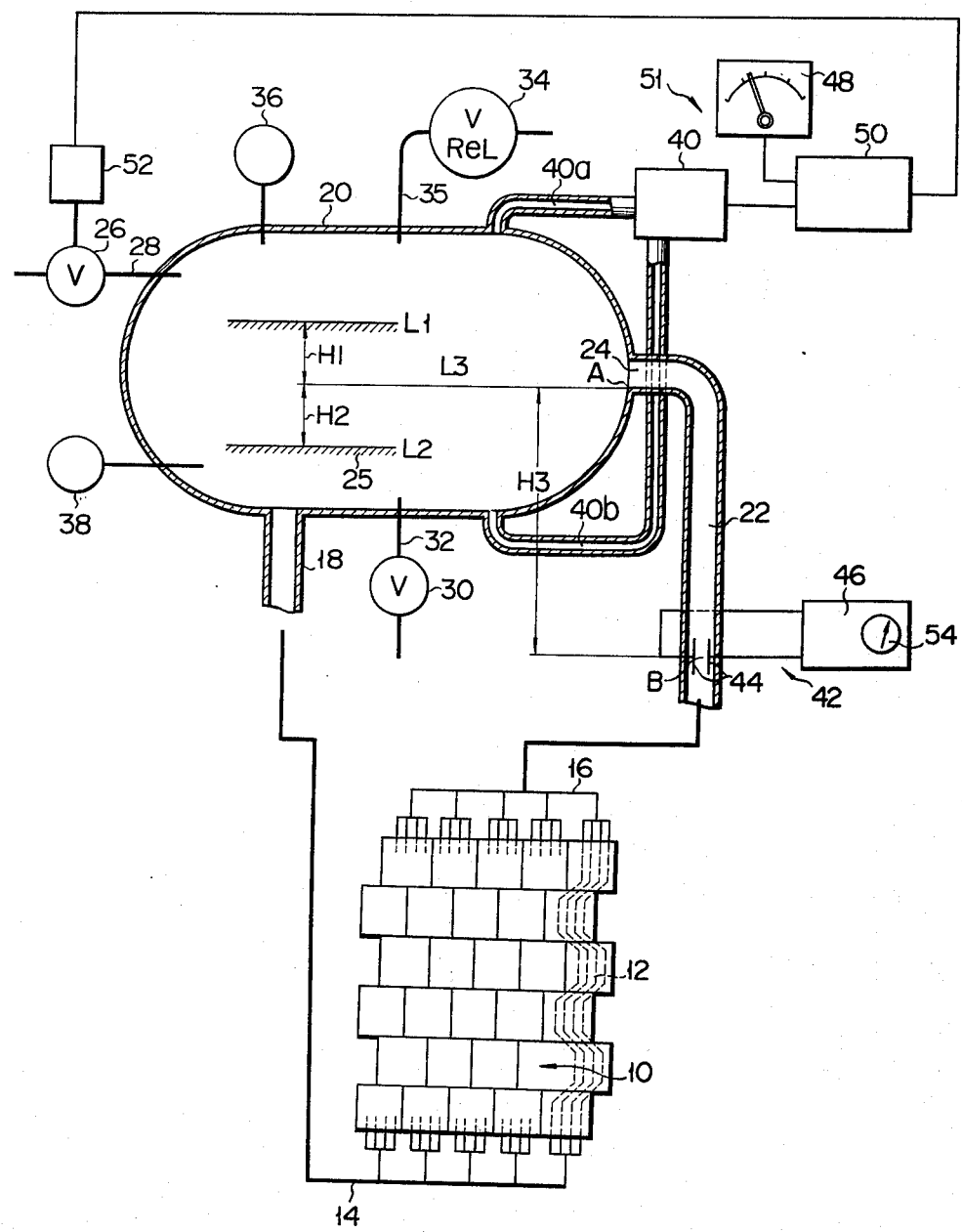
FIG. 1 is a diagramatical view illustrating piping and wiring diagram for permitting flow of a circulating liquid for use in an evaporative cooling system, utilizing the method of the invention.

In FIG. 1, within a cooling stave 10 of a blast furnace (not shown) are provided a large number of cooling pipes 12 vertically extending through the cooling stave 10 in a zigzag manner, the lower ends of said cooling pipes being connected to a supply header 14 and the upper ends thereof to a discharge header 16.

The supply header 14 is connected through a delivery pipe 18 to a steam separator 20 while the discharge header 16 is connected through a discharge pipe 22 to an inlet 24 of the separator 20. Within the separator 20 is received a circulating cooling liquid or circulating coolant 25. The separator 20 is provided with a supplementary feed pipe 28 having a value 26 for controlling the circulating flow of the circulating coolant supplied into the interior of the separator, an exhaust pipe 32 having a valve 30 for exhausting the circulating coolant 25 within the separator 20 into the exterior, and a vapor passageway 35 having a relief valve 34 for keeping the vapor pressure within the separator 20 at a predetermined level. The separator is further provided with a pressure gauge 36 for measuring a vapor pressure within the separator 20, and a thermometer 38 for measuring the temperature of the circulating coolant within the separator. A reference numeral 40 indicates a level meter for measuring the level of the coolant 25, and in FIG. 1 a differential pressure type level meter is shown as said level meter. Different levels of pressure within the separator are introduced from the upper and lower portions of the separator through passageways 40a, 40b, respectively, into said level meter, and this level meter is thereby caused to generate an electrical signal indicating the differential pressure, i.e., the depth of the coolant 25. The level meter is not limited to said differential pressure type level meter, but any known level meter can be employed which includes one utilizing a float, one utilizing radioactive rays, one utilizing the reflection of supersonic wave, and so on.

The discharge pipe 22 is provided with a void meter 42 at a position B lowered by H3 from the lower end A of the inlet 24 of the separator 20. Said void meter 42 is a first means for determining whether the coolant within the discharge pipe 22 is in the above-mentioned first condition or in the above-mentioned second condition, and any known void meter can be employed which includes one utilizing electrodes or one utilizing a system for measuring the transmissivity of γ-rays. In FIG. 1, an electrode type void meter is shown. Within the discharge pipe 22 are disposed two electrode plates 44 in a manner that said electrode plates face each other, whereby the electric resistance of the coolant between both electrode plates 44 is measured by a resistance measuring device 46. Since, as the amount of vapor contained in the coolant is increased, said electric resistance is increased, the void or fraction dryness of vapor can be known from the measured value of electric resistance. A reference numeral 54 designates an indicator for indicating the electric resistance value or vapor void. Further, a peep hole (not shown) is provided at a portion B of the discharge pipe 22 in replacement of the use of said void meter 42, whereby the vapor void can be investigated through said peep hole by a viewer.

A level setting apparatus 48 functions to send to a controller 50 an electrical signal for controlling the level of coolant within the separator 20, i.e., a level setting signal. The controller 50 drives a valve positioner 52 upon receipt of said level setting signal and the electrical signal sent from the level meter 40 to cause the valve 26 to be opened or closed thereby permitting the level of circulating coolant 25 within the separator 20 to coincide with a predetermined level setting value and to be maintained at the predetermined level. The foregoing level controlling operation is performed only when the coolant level is desired to be raised by opening the valve 26 to supply the coolant into the interior of the separator 20 through the supplementary feed pipe 28. Where it is desired to lower the coolant level, no particular operation is usually required. The reason is that when the pressure within the separator 20 is increased due to the action of vapor contained in the coolant delivered through the inlet 24 into the separator to exceed a prescribed level, the vapor within the separator 25 is released through the relief valve 34 into the exterior, so that even when allowed to stand, the coolant 25 within the separator 20 is gradually decreased with the result that the coolant level is lowered of itself.

There will now be described that process from the initial ignition of the blast furnace to the normal operation thereof which is carried out while occurrence of pulsation is being prevented using the coolant circulating apparatus of FIG. 1.

During some initial length of time for the blast furnace operation, the temperature of the circulating coolant is low, and the void meter 42 indicates that the coolant is in the above-mentioned first condition.

At this time, as a first step, the level setting apparatus 48 is so adjusted that the level of coolant within the steam separator 20 is located at a position above the inlet 24, for example, a position L1 of FIG. 1. When the coolant level is below the position L1, it is so controlled as to coincide with L1 by second means comprising the differential pressure type level meter 40, level setting apparatus 48, controller 50, valve positioner 52 and valve 26, namely, an automatic control device 51, and is thus maintained at L1. When the coolant level is above the position L1, said automatic control device 51 is rendered inoperative, so that the coolant level is lowered due to that release of vapor by the relief valve 34 resulting from the elevation of coolant temperature, and when the coolant level is lowered to a position equal to or lower than the position L1, the automatic control device 51 is rendered operative to permit the coolant level to be maintained at L1. This condition corresponds to the condition at said first step. The circulating flow of the coolant starts to occur due to the usual convection from the initial time when the blast furnace is ignited. As a result, even when thermal load is locally applied to the cooling pipes, vapor is prevented from being rapidly generated at such local portions, therefore possible accidents due to such rapid vapor generation can be avoided.

When the blast furnace operation goes on to cause the coolant temperature to be elevated with the result that the void meter 42 has indicated that the coolant has been brought to the above-mentioned second condition, the level setting apparatus is so adjusted as a second step that the level of coolant within the separator 20 is brought to a position below the inlet 24, for example, a position L2 of FIG. 1. In this case, the automatic control device 51 functions to maintain the valve 26 to be closed. Accordingly, the coolant level within the separator is gradually lowered owing to the release of vapor from the relief value 34. When the coolant level reaches a position equal to or lower than said position L2, the automatic control device 51 is rendered operative to maintain the coolant level to be at the position L2. In this case, the coolant rich in vapor is forcefully entered into the separator 20 through the inlet 24. As a result, no pulsation occurs in the circulating coolant. Thus, the blast furnace is subjected to a successful evaporative cooling.

As above described, by executing said first and second steps, the blast furnace operation can be advanced from the initial ignition to the normal operation without running into any trouble of evaporative cooling apparatus.

In the above-described operation, the coolant level is kept in the first step at the position $L_1$, which is higher by $H_1$ than the horizontal surface $L_3$ including the lower end A of the inlet and, in the second step, at the position $L_2$ which is lower by $H_2$ than the horizontal surface $L_3$. It is preferred that each of $H_1$ and $H_2$ be set 1 to 2 times the diameter of the inlet and the vertical distance $H_3$ between $L_3$ and the void metering position B 5 to 6 times the diameter of the inlet. In addition, the fraction dryness of the circulating coolant measured at a predetermined void metering position should be set at 5 to 20%, preferably about 10%, for changing the operation from the first step to the second step. The conditions thus set permit a smooth change from the first step to the second step.

Figure 2:
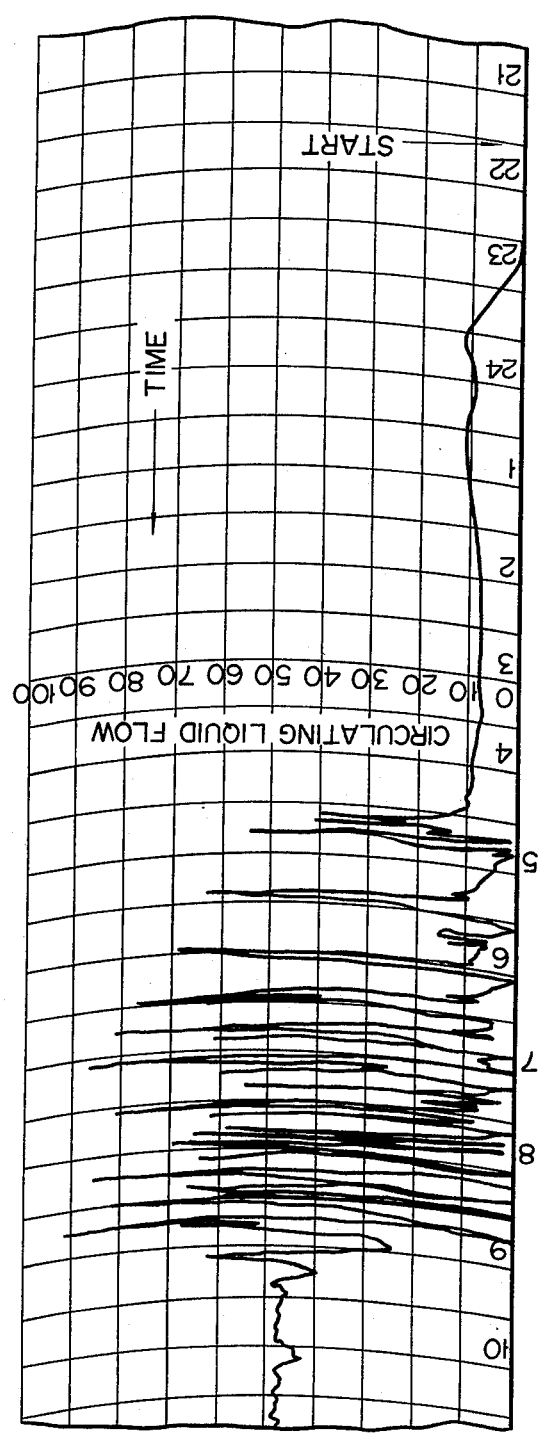
FIG. 2 is a measurement data illustrating variations with time of the quantity of circulating liquid flow in the case where the circulating liquid is permitted to flow through the cooling pipes in accordance with the prior art method.
Figure 3:
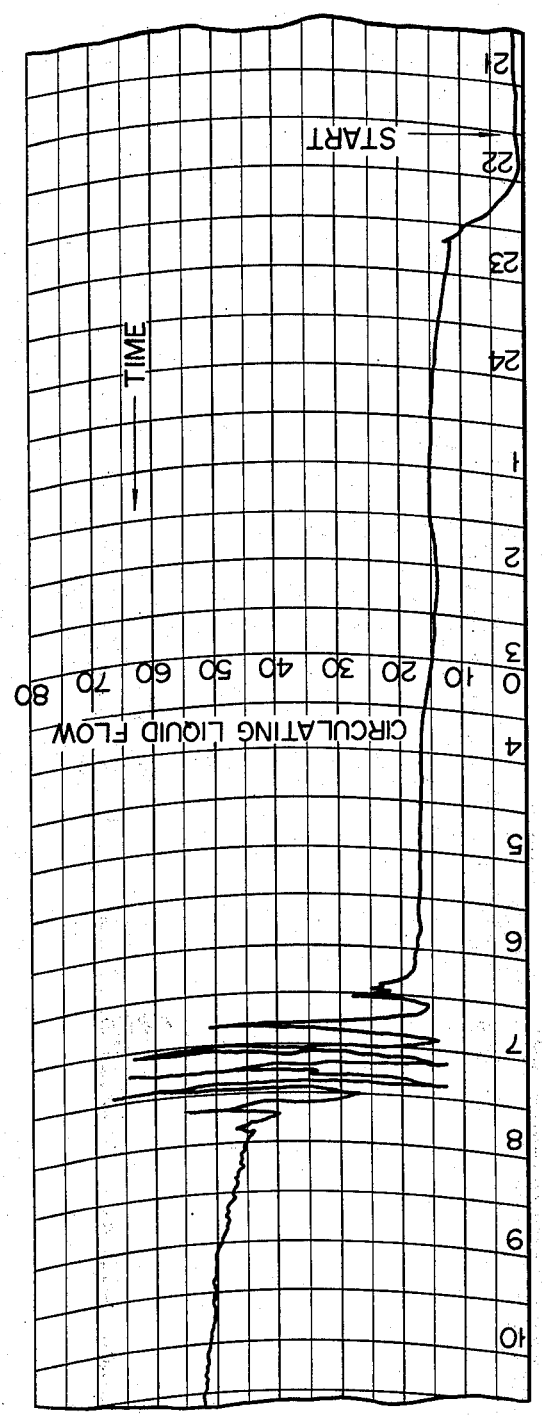
FIG. 3 is a measurement data similar to FIG. 2, obtained in accordance with the method of the invention.

FIG. 2 is a data showing variations with time of the quantity of coolant flow in the case where the evaporative cooling of the blast furnace is performed by the prior art method when the coolant is in the above-mentioned first condition. FIG. 3 is a data similar to FIG. 1, obtained by measuring the quantity of coolant flow using the method of the invention.

From comparison of FIG. 2 with FIG. 3, it is seen that where the method of this invention is used, the pulsation in the circulating liquid, i.e., in the circulating coolant is weaker and the duration of said pulsation is shorter, as compared with the case where the prior art method is used. That is, it is seen that the effect of preventing the pulsation occurrence using the method of the invention is prominent.

What we claim is:

1. A method of preventing occurrence of pulsation in circulating liquid for evaporative cooling flowing through a cooling stave of a blast furnace, comprising the first step of maintaining, where the circulating liquid within a discharge pipe is in a first condition in which the fraction dryness thereof is not greater than a prescribed value, the surface level of the circulating liquid within the steam separator to be at a position higher than an inlet of the separator connecting to the discharge pipe, and the second step of maintaining, where the circulating liquid within the discharge pipe is in a second condition in which the fraction dryness thereof exceeds said prescribed value, said surface level of the circulating liquid within the steam separator to be at a position lower than said inlet of the separator.

2. A method according to claim 1 wherein said prescribed value of said fraction dryness ranges between 5 and 20%.

3. A method according to claim 1 wherein said prescribed value of said fraction dryness is substantially 10%.

4. A method according to claim 1 wherein in said first step said surface level of the circulating liquid within the steam separator is maintained at a position raised from the lower end of said inlet by an extent equal to a value 1 to 2 times the diameter of said inlet; and in said second step said surface level is maintained at a position lowered from the lower end of said inlet by an extent equal to a value 1 to 2 times the diameter of said inlet.

5. A method according to claim 1 wherein a void meter is used to detect said first and second conditions.

6. A method according to claim 5 wherein that metering portion for said void meter provided for said discharge pipe is provided at a position lowered from the lower end of said inlet by an extent equal to a value 5 to 6 times the diameter of said inlet.

* * * * *